(12) United States Patent
Pathak et al.

(10) Patent No.: US 10,972,404 B2
(45) Date of Patent: Apr. 6, 2021

(54) GENERATE DEPLOY AND PROVISION A CUSTOMIZED CLOUD DEVICE APPLICATION USING A SOFTWARE SERVICE AND DEVICE STORE

(71) Applicant: Rapyuta Robotics Co., Ltd, Tokyo (JP)

(72) Inventors: Alankrita Pathak, Tokyo (JP); Dhananjay Sathe, Tokyo (JP); Gajamohan Mohanarajah, Tokyo (JP)

(73) Assignee: RAPYUTA ROBOTICS CO., LTD., Tokyo (JP)

( * ) Notice: Subject to any disclaimer, the term of this patent is extended or adjusted under 35 U.S.C. 154(b) by 88 days.

(21) Appl. No.: 16/297,043

(22) Filed: Mar. 8, 2019

(65) Prior Publication Data
US 2019/0207866 A1 Jul. 4, 2019

Related U.S. Application Data

(63) Continuation-in-part of application No. 16/034,995, filed on Jul. 13, 2018, now Pat. No. 10,860,394.
(Continued)

(51) Int. Cl.
*H04L 29/08* (2006.01)
*H04L 12/911* (2013.01)
(Continued)

(52) U.S. Cl.
CPC ............ *H04L 47/70* (2013.01); *G06F 16/245* (2019.01); *H04L 41/12* (2013.01); *H04L 41/20* (2013.01); *H04L 41/22* (2013.01); *H04L 41/5051* (2013.01); *H04L 47/72* (2013.01); *H04L 67/10* (2013.01); *H04L 67/1097* (2013.01); *H04L 67/2809* (2013.01); *H04L 41/5096* (2013.01)

(58) Field of Classification Search
CPC ....... H04L 67/10; H04L 41/22; H04L 63/102; H04L 67/2809; H04L 12/2803; H04L 67/125; H04L 41/0806; H04L 47/70; H04L 67/1042; H04L 41/20; H04L 12/2816; H04L 65/1073; G06F 16/245
See application file for complete search history.

(56) References Cited

U.S. PATENT DOCUMENTS

2011/0173328 A1* 7/2011 Park ................... G06F 9/5072
709/226
2013/0124807 A1* 5/2013 Nielsen .............. G06F 11/1438
711/162

* cited by examiner

*Primary Examiner* — Backhean Tiv
*Assistant Examiner* — Linh T. Nguyen
(74) *Attorney, Agent, or Firm* — Trupti P. Joshi

(57) ABSTRACT

A system and method to generate and deploy a customized cloud device application has been described. A platform broker analyzes a deployment information of a software service included in the customized cloud device application. Based on the analysis, the platform broker determines whether the software service is to be deployed at a cloud resource or devices. Based on the determination and a composition pattern, the platform broker sends a software service deployment request to a cloud broker and a device broker. Based on the software service deployment request, an instance of the software service is generated and the generated instance of the software service is deployed to one of the cloud resource or one or more devices. Finally, the generated instance of the customized cloud device application bound to the deployed instance of the software service is deployed to one of the one or more cloud resources and the device.

20 Claims, 13 Drawing Sheets

Related U.S. Application Data

(60) Provisional application No. 62/559,938, filed on Sep. 18, 2017.

(51) Int. Cl.
*H04L 12/24* (2006.01)
*G06F 16/245* (2019.01)

US 10,972,404 B2

GENERATE DEPLOY AND PROVISION A CUSTOMIZED CLOUD DEVICE APPLICATION USING A SOFTWARE SERVICE AND DEVICE STORE

CROSS REFERENCE TO RELATED APPLICATION

This application is a continuation-in-part of a U.S. non-provisional application Ser. No. 16/034,995 titled "Generate and provision a customized cloud device application using a software service store", filed on Jul. 13, 2018 that claims priority of a U.S. provisional application 62/559,938, filed on Sep. 18, 2017 that are both included here in its entirety.

TECHNICAL FIELD

The present invention relates generally to a software and device service store and more particularly to generating and deploying a customized cloud device application using a software service store and device service store.

BACKGROUND

Cloud computing and robotics are two areas that have grown exponentially in the last decade. Cloud computing is a model to enable ubiquitous, convenient, on-demand network access to a shared pool of configurable computing resources (e.g., networks, servers, storage, applications, and services) that can be rapidly provisioned and released with minimal management effort or service provider interaction. Robotics deal with the design, construction, operation, and use of machines, as well as the collaboration of the machines with computer system for control, feedback, and information processing related to machines.

Both, these technologies provide different advantages. Currently, cloud robotics is an emerging field that attempts to use cloud technologies for the field of robotics. A cloud robotics solution provider would require both cloud services and robotics (device) services for offering cloud robotics application to an end user and a platform that allows the solution provider to deploy the application to the cloud resource and/or the robot/device.

Therefore there is a need to provide a collaborative environment that allows the cloud robotics solution provider to easily generate a complex robotics application using re-usable cloud or device services provided by cloud and device application developers. Further, there is also a need to provide a collaborative environment that allows deployment and provisioning of the customized cloud device application to the cloud resource and/or devices that execute the customized cloud device application.

DETAILED DESCRIPTION

Figure 1:
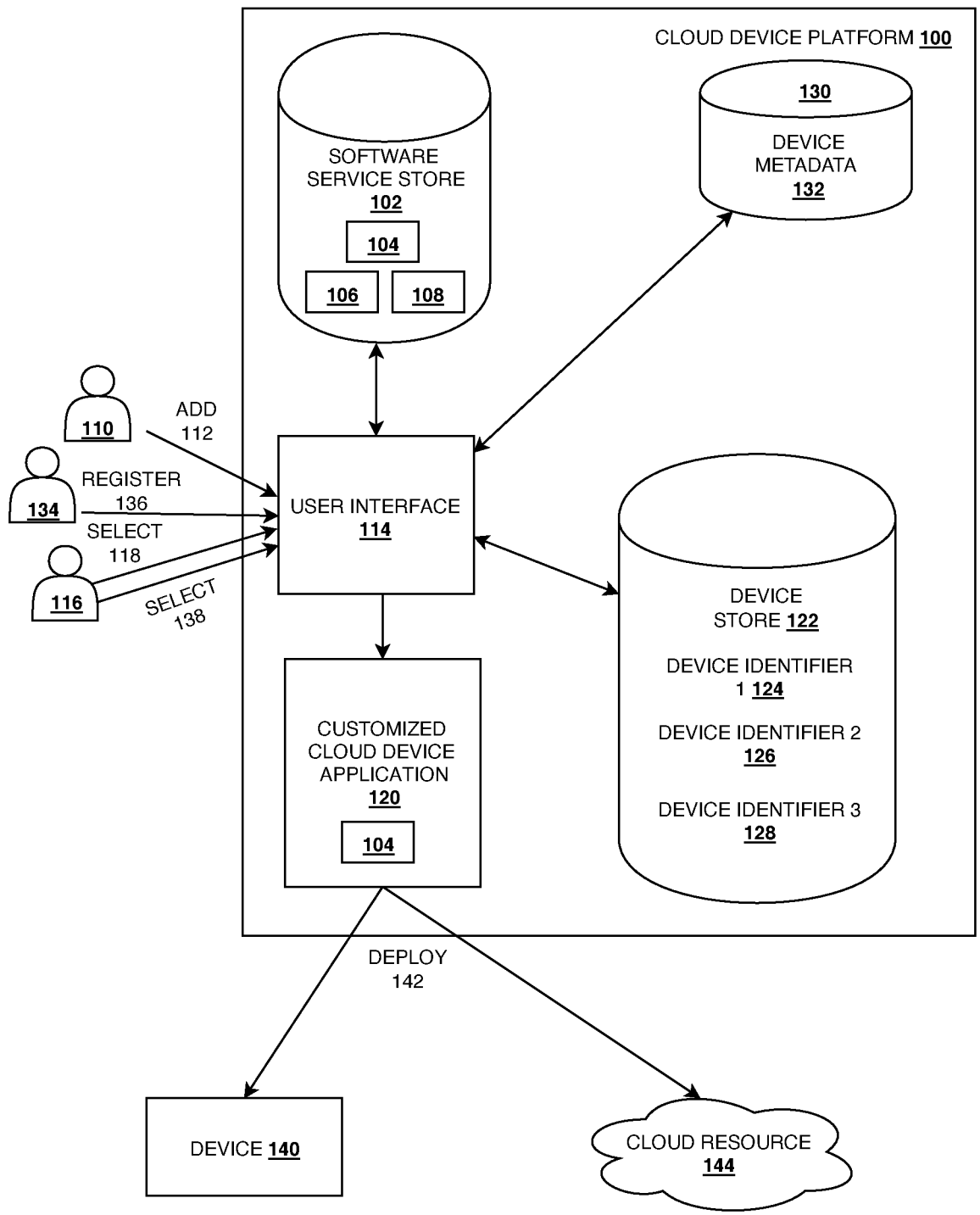
FIG. 1 is an exemplary block diagram illustrating a system to generate, provision, and deploy a customized cloud device application, according to an embodiment.

Embodiments of techniques to generate and deploy a customized cloud device application using a device and software service store are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Cloud robotics is a field of robotics that invokes cloud technologies such as cloud computing, cloud storage, and other Internet technologies centred on the benefits of converged infrastructure and shared services for robotics. Connecting robots or devices to the cloud allows offloading heavy computation and storage of the robots or devices to the cloud resource. This is helpful in reducing the weight and enhancing computation performance of the device and/or robot. Additionally the cloud resource also provides a centralized control for managing several robots from a remote location. Despite the various advantages of cloud connected robots, connecting devices or robots via the cloud resource is extremely complex, as discussed above.

To address one or more of the issues discussed above, a cloud device platform is proposed. A cloud device platform is a Platform-as-a-Service (PaaS) that provides hardware and software tools, for application development, to users over the Internet. The cloud device platform provides an on-demand access to a shared pool of reusable software resources (applications and services) that can be easily provisioned and released with minimal management effort or the cloud robotics solution provider interaction. The cloud device platform also provides an on-demand access to a shared pool of devices (for example, Unmanned Aerial Vehicles (UAVs), robotic arm, etc.) including devices that can control other devices on which the software can be deployed and provisioned. The cloud device platform also allows cloud and/or robotics developers to easily add reusable software services and devices to the shared pool of software services store and device service store, respectively. The cloud device platform also allows the cloud device solution provider to generate a customized cloud device application by selecting software services from software service store and then deploying the application to a selected device or cloud resource.

A customized cloud device application is an application that executes at the cloud resource and/or one or more devices to perform a particular action. For example, a customized cloud device application may be an ortho-photo map generation application that executes on the cloud resource and an unmanned aerial vehicle (UAV) (device). At the UAV, the orthophoto map application captures images and videos using the UAV camera. The application then sends the captured images and videos to a cloud resource. The orthophoto map application then executes at the cloud resource to generate an orthophoto map based on the captured images.

In one embodiment, a device is an object or a physical entity having a unique identifier and an ability to transfer data. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities. A cloud resource is a collection of configurable system resources and services that can be rapidly provisioned with minimal management effort over a network. The cloud resource provides several resources including computing power, storage, and other IT resources.

FIG. 1 is an exemplary block diagram illustrating a cloud device platform 100 to generate and deploy a customized cloud device application, according to an embodiment. To generate the customized cloud device application, the cloud device platform 100 provides a software service store 102 that is a categorized, tagged, and user rated collection of reusable software services, for example, software services 104-108. A software service is a reusable service that provides one or more cloud and/or device related functionalities. For example, the software services 104-108 may include navigation service (device specific service), mapping service (device specific service), messaging service (cloud specific service), caching service (cloud specific service), etc. In one embodiment, the software service is a web service that exposes public or private endpoints (i.e., name, protocol, and port) using web protocols. A software service may have one or more of the following properties:

a. Code reuse: Software that is reusable;
b. Usage policy for using the service; and
c. Address for discovering the service.

In one embodiment, the software services 104-108 at the software service store 102 are reusable, i.e., the software services may be used by different customized cloud device applications and can be deployed and provisioned on any device or a cloud resource provided by the cloud device platform or a third-party cloud solution provider. The cloud device platform 100 allows a user 110 to define and add 112 software services, for example software services 104-108, to the software service store 102 at a user interface 114 included in the cloud device platform 100. The user 110 may be a cloud or device software developer that can write reusable software services.

When adding 112 the software services 104-108 to software service store 102 the user 110 may also define, at the user interface 114, a set of exposed parameters and exposed network endpoints for the software services 104-108.

Exposed parameters are parameters that the software services 104-108 expose to another software service or an application to allow application or another software service to use the application service. For example, username, password, and database store variables may be exposed parameters defined for a database software service. Whenever an application or software service selects the database software service then the username, password, and database store variables of a cloud database, where the database software service is deployed, are retrieved and provided to the application or service.

The network endpoints for a software service are web service endpoints for accessing a software service. In particular, a network endpoint can be an exposed parameter value that is injected to a dependent service during a binding process. In one embodiment, the exposed network endpoint is a protocol, port, and service name. The supported protocols may include, for example, Secure TCP (TLS/SNI), HTTP/Websocket, and HTTPS/Websocket-Secure and UDP.

In one embodiment, a cloud device solution provider 116 selects 118 one or more reusable software services 104-108 at the user interface 114 to generate a customized cloud device application 120. The selected one or more reusable software services 104-108 may be added as dependent application services to the customized cloud device application 120. For example, as shown in FIG. 1, the software service 104 is selected and included in the application 120.

The cloud device platform 102 also includes a device store 122 that has a list of device identifiers, for example device identifier 1 124, device identifier 2 126, and device identifier 3 128, corresponding to devices (not shown) on which the software services and/or the customized cloud device application can be deployed and provisioned. The device identifiers 124-128 may include, for example, device names identifying the devices. The devices may include edge devices, Internet of Thing (IoT) devices, mobile devices, for example, Autonomous Ground Vehicles (AGVs), Unmanned Aerial Vehicles (UAVs), and Autonomous Underwater Vehicles (AUVs); or stationary devices, for example, a robotic arm.

In one embodiment, the cloud device platform 100 also includes a device metadata store 130 storing device metadata 132 of several devices (not shown). A device metadata 132 may include one or more device features and corresponding device feature values. For example, device metadata may include device features "Operating System" and "battery remaining" and corresponding device feature values "Ubuntu 16.04" and "58%", respectively. A device feature may be unique to the device, for example, a registration number of the device, or may be a common feature among several devices, for example, Operating System (OS) running on the device. The cloud device platform 102 may either auto-determine the device metadata 132 or may determine it based on user provided information.

In one embodiment, the user provided information may include information provided by a user 134 when registering 136 the device at the user interface 114 of the cloud device platform 100. For example, the user provided information may include a device runtime selected by the user. The auto-determined device metadata may include the device metadata that are dynamically determined by the cloud device platform 100. For example, the OS version of the OS running at the device, the amount of battery remaining, and other device features, for example, device capabilities, sensor information, etc. The user 114 may include, for example, a hardware engineer, a robotics developer, or a hardware manufacturer.

The device features included in the device metadata 132 may be used by the cloud device solution provider 116 for searching and selecting 138 one or more devices to deploy and provision the customized cloud device application 120. For example, a cloud device solution provider 116 may search for UAVs using a device feature "maximum flight velocity" (device feature). In this example, the cloud device solution provider 116 may search for devices with a search query "maximum flight velocity" (device feature) "greater than 10 m/s" (search condition). The cloud device platform 100 executes the search query to identify the UAVs that have device metadata matching the search query ("maximum velocity" (device feature) equal to or greater than 10 m/s). The device identifiers of the identified UAV, determined based on the executed search query, are then displayed at the user interface 114 of the cloud device platform 100. The user can select one or more device identifiers, for example the device identifier 2 126 to select a device, for example device 140, on which the customized cloud device application 120 is to be provisioned and deployed.

The device store 122 therefore allows a hardware developer or a hardware provider to register their devices on the cloud device platform 100 and a cloud device solution provider 116 to easily select one or more devices at the user interface 114 for provisioning and deploying the customized cloud device application 120. Further, the combination of device store 122 and software service store 104 at the cloud device platform 102 allows the cloud device solution provider 116 to send a request to the user interface 114 for deploying 142 the customized cloud device application 120 to a cloud resource 144 and the selected device 140. For the purpose of simplicity, only one device, device 140, is shown in FIG. 1, however the customized cloud device application 120 can be deployed on any number of devices. In one embodiment, before deploying the customized cloud device application 120, an instance of the software service 104 is deployed to either the cloud resource 144 or device 140 or both. The exposed parameters, parameter values, and the exposed service point of the deployed instance of the software service 104 is then bound to an instance of the customized cloud device application 120. The application 120 bound to the deployed instance of the software service 104 is finally deployed to the cloud resource 144 and the device 140.

Binding is a process of retrieving data values of the exposed parameters and exposed network endpoints of the deployed instance of software service instance 104 and injecting the retrieved data values and the exposed parameters into the instance of the customized cloud device application 120. The binding operation allows the application to access and use data values related to the selected software services. The binding operation completes the provisioning of the customized cloud device application 120. Provisioning is the process of providing the parameters, for example credentials, license, permission, etc., to a deployed application that are required for executing the application. Finally, the deployed customized cloud device application 120 is executed either by the device 140 or the cloud resource 14 or both. Depending on the software services included in the customized cloud device application 120 the customized cloud device application 120 executed at the device 140 or the cloud resource 144 or both may provide different execution results.

For example, consider a robot management application that selects a "temperature sensor" service to measure the room temperature. The "temperature sensor" service has an exposed network endpoint HOST AND PORT (the network endpoint also includes the port) and provides an API to obtain the room temperature value. The cloud device platform generates and deploys an instance of the temperature sensor service to a sensor (device). A binding operation is performed by inserting the exposed network endpoint to the instance of robot management application. After binding, a query can be executed on the API to obtain the room temperature value, measured by the sensor, which can be accessed by the robot management application instance using the exposed network endpoint HOST AND PORT. Finally the robot management application bound to the temperature sensor service may be deployed at the cloud resource. In this case, the deployed robot management application executing at the cloud can access and share the room temperature value determined by the dependent deployed temperature service, executing at the sensor, required for determining whether the robot can work outdoors at the determined temperature.

In one embodiment, the cloud device platform 100 also allows controlling the instantiation life cycle of the software service and the application. For example, the cloud device platform 100 can either create a new instance of the software service for each application deployment request or use an existing instance of the application or dependent software service at the application deployment request.

The current disclosure therefore provides a technical solution in the field of cloud robotics and cloud device platforms by allowing a cloud device solution provider to easily execute and build customized cloud device application by using existing re-usable software services. Further, the device service store also allows selecting the devices to which the customized cloud device application is to be provisioned and deployed.

Figure 2:
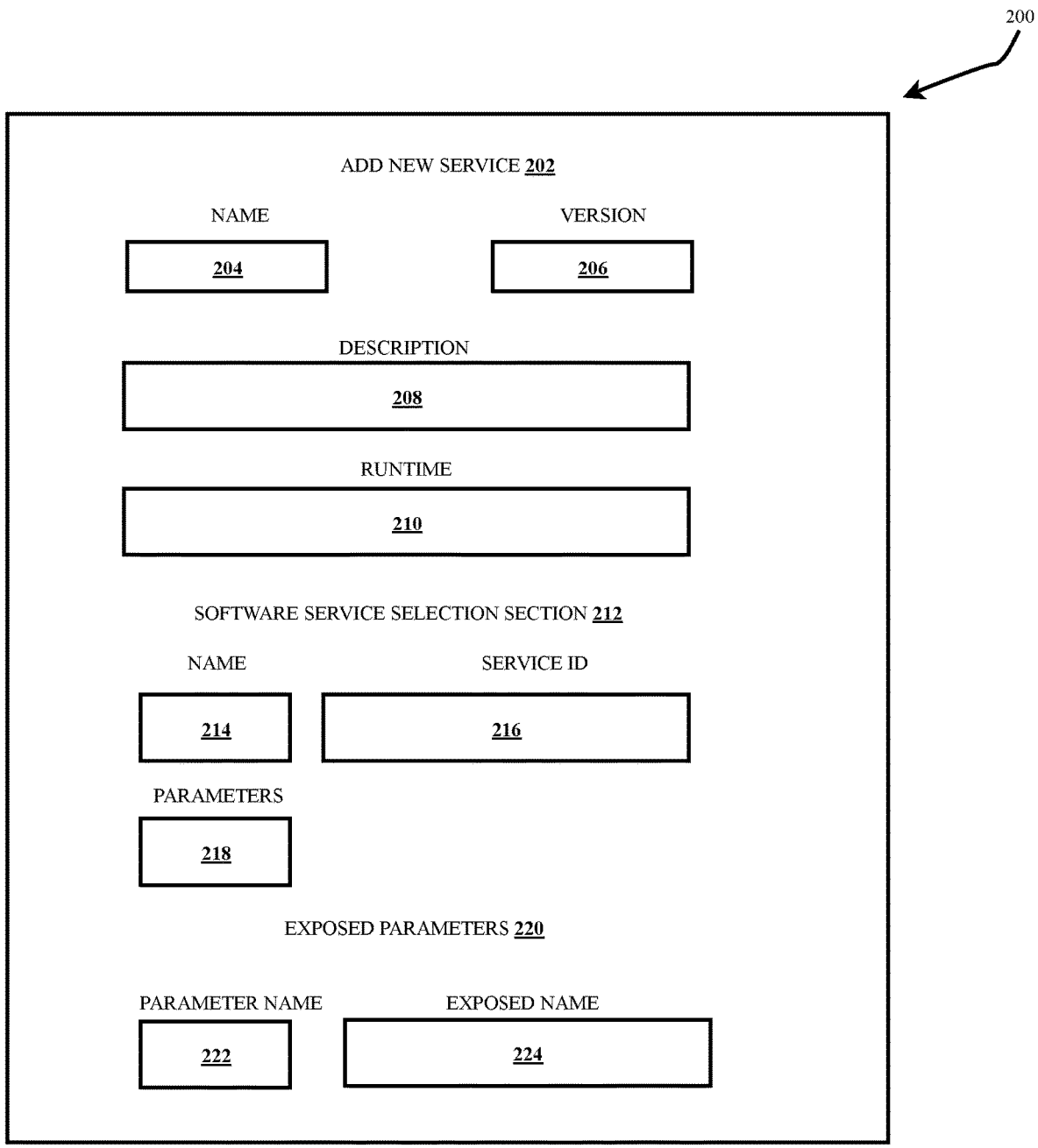
FIG. 2 is an illustration of an exemplary user interface (UI) at the cloud device platform for defining an application or software service, according to an embodiment.

FIG. 2 is an illustration of an exemplary user interface (UI) 200 at the cloud device platform for defining an application or software service, according to an embodiment. In one embodiment, a developer selects an "add new service" tab (not shown) that opens an "add new service" form 202 for adding a new application or a software service to the software service store. A user provides name 204, version 206, and description 208 of the application and/or software service at the form 202. The user also defines the runtime 210 of the application or software service. The runtime of the application or software service defines whether the application or software service is to be executed at the cloud resource and/or the device. In case the runtime parameter is not selected when defining the application or software service then the software service can be deployed at both the cloud resource or the device depending on the runtime (cloud resource or device) selected at the time of deployment.

The form 202 also includes a software service selection section 212 to select a software service from the software service store to be included to the application. A name 214 and a service id 216 of the service is provided to identify the software service that is to be selected for the application. The form 202 also allows a user to identify parameters 218 of the selected software service. The form also allows identifying exposed parameters 220 of the software service by the parameter name 222 and the name 224 by which the parameter is exposed (exposed name).

In one embodiment, the form 202 also allows a user to select a composition pattern (not shown) for composing an application with the selected software service. Composing an application is a process to select a pattern in which the application and application service work together to perform one or more useful actions. Selecting the composition pattern includes selects an instantiation lifecycle for a software service. The different instantiation life cycle may depend on whether the user wants to create a new instance or use an existing instance of the software service for each deployment of the application.

In one embodiment, a user may select a one-to-one composition pattern when a user wants a one-to-one relationship between an application and the selected software services. One-to-one composition pattern may be selected when application and the application service should have the same instantiation lifecycle. In one-to-one composition pattern, whenever a deployment request is received for deploying an application then a new instance of the corresponding selected software service and the application are generated and deployed.

For example, consider a case of a robot_motion application that manages motion of a robot. This robot_motion application requires an obstacle_detection software service to detect obstacles during the robot's motion. In this case, the user may select an obstacle_detection software service as a dependency for the robot_motion application. The user may also select a one-to-one composition pattern for the composition of robot_motion application that has included an obstacle_detection software service. Based on the selected one-to-one composition pattern, an instance of obstacle_detection software service is generated and deployed and an instance of robot_motion application is generated whenever a deployment request is received for deploying the robot_motion application. A binding operation is then performed to bind the generated instance of obstacle_detection software service with the instance of robot_motion application for detecting obstacles during robot's motion.

In one embodiment, a software service may have one or more software services as dependencies that may also have dependencies of its own. In this case, when a one-to-one composition pattern is selected for an application and this software service then initially the dependent software service(s) are instantiated and deployed at a cloud resource and/or device. The deployed instance of the dependent software service(s) are then bound to an instance of the software service. The instance of the software service including the bound dependent software service(s) is then deployed to cloud resource and/or device. An instance of the application may then be bound to the deployed instance of the software service. Finally, this application instance including the bound instances of the software service and the dependent software service(s) is deployed to a cloud resource or a device.

Similarly, the user may select a one-to-many composition pattern when a user wants to use an existing instance of a software service for different deployments of application. This composition pattern is selected when the developer needs to compose the desired service behaviour by coupling application and service that follow different instantiation life-cycles and bind the application and service at package instantiation. For example, when multiple short lived agents are to be coupled with a long-running/stateful shared service (many-to-one).

For example, consider a map software service that provides a map for navigation in a particular area. An Unmanned Aerial Vehicle (UAV) navigation application defined to fly a UAV over a particular area requires the map software service for navigating over a particular area. In this case, the user may select a map software service for the UAV navigation application. A user selects a one-to-many composition pattern for the composition of UAV navigation application that has the map software service as a dependency. When a deployment request is received for deploying the UAV navigation application then an instance of the UAV navigation application is generated and deployed. The map software service in this case is a long-running service. Based on the selected one-to-many composition pattern, an existing deployed instance of map software service binds to each new instance of UAV navigation application for allowing different UAVs to use the same map service.

In one embodiment, the cloud device platform also allows a user to define a singleton composition pattern when the software service has to be instantiated only for the first deployment request and the same instance of the software service is used for any subsequent deployment request. A singleton pattern is a software design pattern that restricts the instantiation of a class to one object.

Further a user is also allowed to define an "affinity" or "anti-affinity" property for a software service with respect to an existing software service. An "affinity" property for a software service defines automatic deployment of a software service to a device at which another software service, which has an "affinity" property defined with respect to the software service", is deployed. Similarly, an "anti-affinity" property does not allow deployment of a software service to a device at which another software service, which has an "affinity" property defined with respect to the software service" is deployed.

Finally the developer submits the application or software service to add the application or software service to the software service store. In one embodiment, after the application or software service is added to the software service store it can be deployed and provisioned at the cloud resource and/or devices. The application or services added to the software service store may then be classified automatically to one of the service classifications defined in the software service store. For example, an added service may be classified as one of the service classes: robotics services, device services, maintenance services, and cloud based services. Further some of the services may be classified into two or more service classes. The classification of a service allows a cloud device solution provider to easily select a service for generating the application.

In one embodiment, the different details provided at the user interface is stored in an application manifest file that includes information for building, deploying, and provisioning the software service to the cloud resource and/or device. The software service manifest also includes a selected composition relationship between the software service and application.

Figure 3:
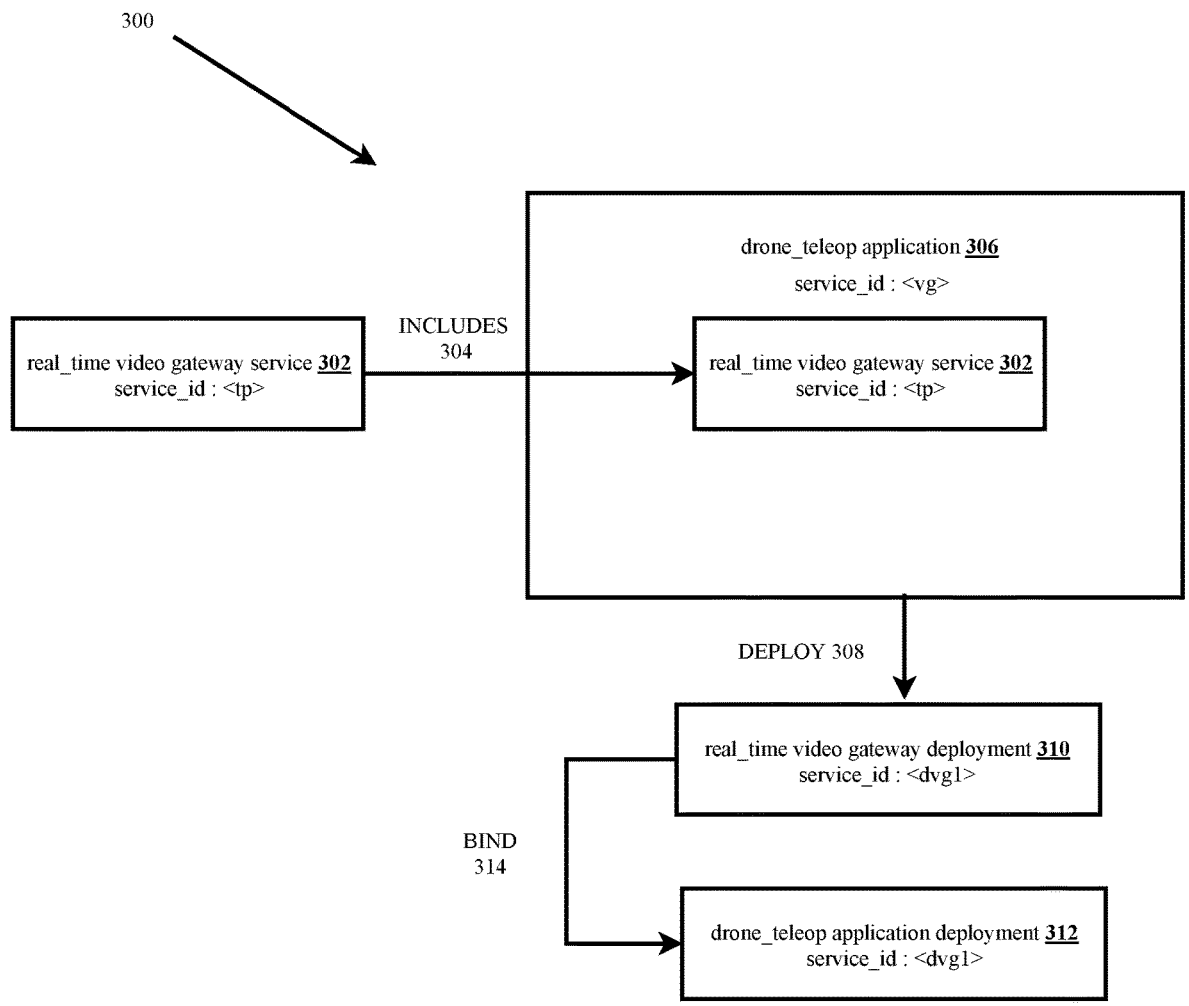
FIG. 3 is an exemplary block diagram illustrating instantiation and deployment of application when a one-to-one composition pattern is selected, according to an embodiment.

FIG. 3 is an exemplary block diagram 300 illustrating a process to instantiate and deploy application when a one-to-one composition pattern is selected, according to an embodiment. A developer when adding a robot teleop application to the software service store may select a "real-time video gateway" software service with a one-to-one composition pattern.

The "real-time video gateway" service is a service that abstracts the video streaming logic and the underlying complex infrastructure into a simple_video_gateway that may be reused by different kinds of robot applications—for example, an Automated Guided Vehicle (AGV) application or a UAV application.

As shown in FIG. 3, the "real_time video gateway service" 302 (service_id<tp>) is included 304 as a service to a "drone_teleop application" 306 (service_id<vg>). The "drone_teleop application" 306 may include any number of services, however for sake of simplicity only one service is shown in FIG. 3. A one-to-one composition pattern is selected for composing the "drone_teleop application" 306 including the "real_time video gateway service" 306. Next when a deployment request 308 is received for deploying the "drone_teleop application" 306 then an instance of the "real_time video gateway service" 302 and the "drone_teleop application" 306 is generated. The instance of the "real_time video gateway service" 302 is then deployed to a cloud resource and/or device. The deployed instance of the "real_time video gateway" service 302 is then bound to the instance of the "drone_teleop application" 306. Finally the instance of the "drone_teleop application" 306 bound to the deployed instance of "real_time video gateway service" 302 is deployed to a cloud resource and/or device.

As shown in FIG. 3, the "real_time video gateway service deployment" 310 is a deployed instance of the "real_time video gateway service" 306. The "drone_teleop application service deployment" 312 (deployment_id: <dvg1>) is a deployed instance of "drone_teleop service" 306 that is deployed after binding 314 an instance of the "real_time video gateway service" 306 with the "real_time video gateway service deployment" 310. Based on the binding operation 314 the retrieved data value of the exposed parameters and exposed network endpoints of the "real_time video gateway service deployment" 310 are injected to the "drone_teleop service deployment" 312 that allows it to access the real_time videos using the exposed network endpoint.

Figure 4:
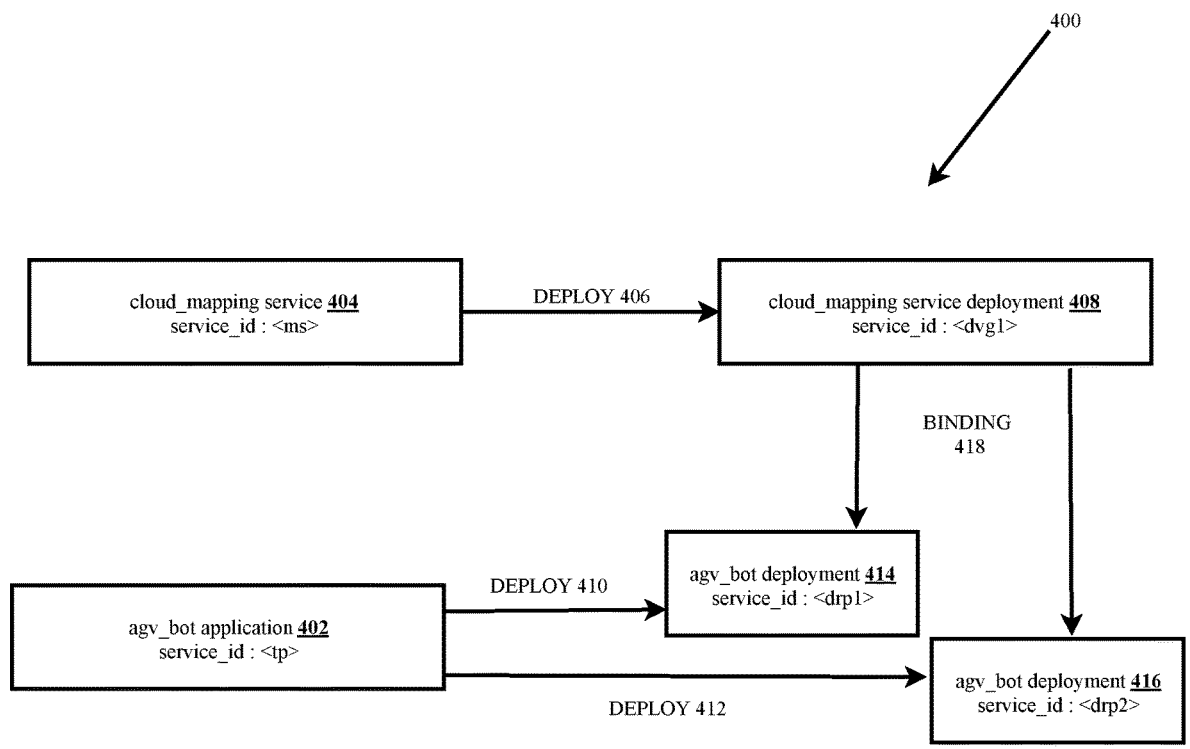
FIG. 4 is an exemplary block diagram illustrating instantiation and deployment of application when a one-to-many composition pattern is selected, according to an embodiment.

FIG. 4 is an exemplary block diagram 400 illustrating instantiation and deployment of a customized cloud device application when a one-to-many composition pattern is selected, according to an embodiment. A developer when adding an agv_bot application 402, which is a robot_bot application, having service_id: <rp> to the software service store may select cloud_mapping service (service_id: <ms>) 404 with a one-to-many composition pattern.

The cloud_mapping service 404 is a service that maintains a global map of a warehouse. Different agv_bot applications may use the cloud_mapping service to navigate the warehouse. Based on the selected one-to-many composition pattern, the "cloud_mapping" service (service_id: <ms>) 404 is instantiated and deployed 406 at the cloud resource to obtain cloud_mapping_service deployment 408 with deployment_id: <dms>.

Next whenever deployment requests for deploying the agv_bot application 402 (service_id: <rp>) is received then instances of the agv_bot application is instantiated and bound to the deployed instance of the cloud mapping service, i.e., cloud_mapping_service deployment 408. For example as shown in FIG. 4, based on two deployment requests two instances of the agv_bot application 402 are instantiated and bound to the cloud_mapping_service deployment 408. The two instances of agv_bot_application 402 bound to the cloud_mapping_service deployment 408 are deployed 410 and 412 to obtain agv_bot deployments 414 and 416, respectively, with deployment_id: <drp1> and agv_bot deployment, deployment_id: <drp2>, respectively. The agv_bot deployments 414 and 416 are bound 418 to the cloud_mapping service deployment 408.

A binding operation 418 provides the exposed parameters, values, and network endpoint of the deployed instance of the cloud_mapping service 408 to the different instances 414 and 416 of the agv_bot application 402. The different deployed instances 414 and 416 of the agv_bot application 402 can use the exposed parameters and the corresponding value of the deployed instance of cloud_mapping service 408 to obtain the warehouse map for navigating the warehouse.

Figure 5:
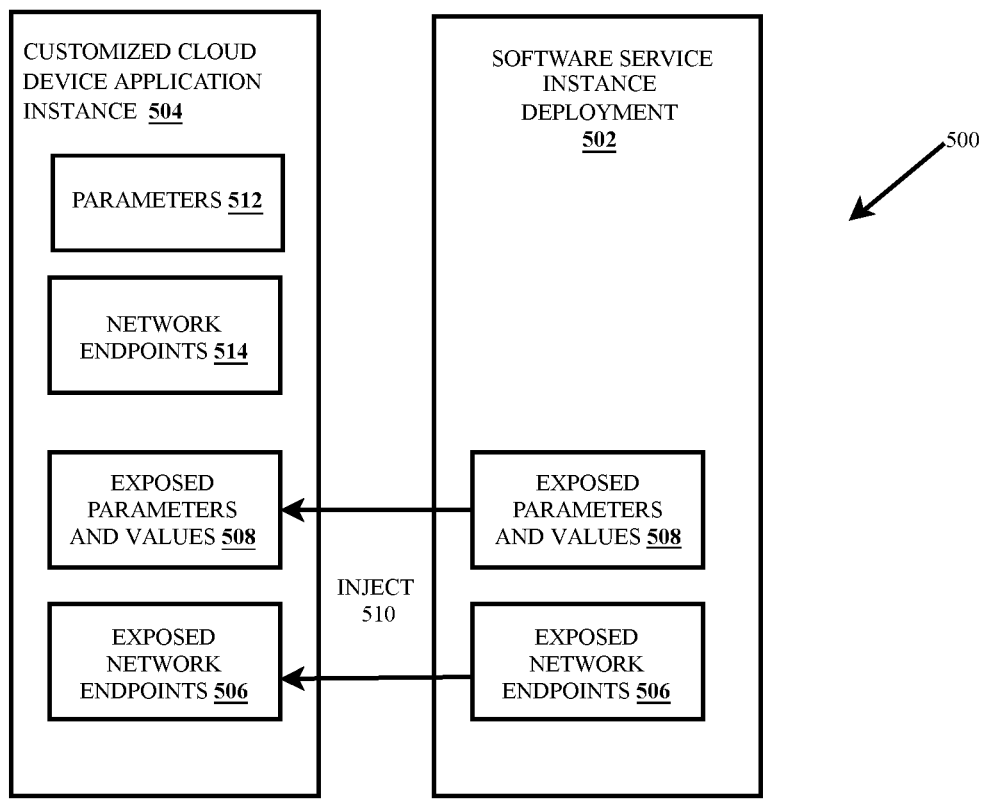
FIG. 5 is an exemplary process flow diagram illustrating a process to bind a software service to an application, according to an embodiment.

FIG. 5 is an exemplary process flow diagram illustrating a process 500 to bind a software service instance to an application, according to an embodiment. The binding operation binds a software service instance deployment 502 with customized cloud device application instance 504. The software service instance deployment 502 includes the source code of the software service and dependencies of the software service, including file system, system utilities, etc. Further the software service instance deployment 502 also includes exposed network endpoints 506 and exposed parameters and values 508.

In order to bind the software service instance deployment 502 to the customized cloud device application instance 504, the exposed network endpoints 506 and exposed parameters and parameter values 508 from the software service instance deployment 502 is retrieved and stored at a relational database (not shown). The exposed network endpoints 506 and exposed parameters and parameter values 508 of the software service instance deployment 502 are then injected 510 as an environment variable to the customized cloud device application instance 502. Injecting the exposed network endpoints 506 and exposed parameters and parameter values 508 binds the customized cloud device application instance 504 to the software service instance deployment 502 allowing the customized cloud device application instance 502 to use the software service instance deployment 502. Post binding, the customized cloud device application 502 with its parameters 512 and network endpoints 514 and injected exposed network endpoints 506 and exposed parameters and parameter values 508 is deployed to a cloud resource or a device. The deployed cloud device application 504 is able to perform complex cloud robotics function provided by the bound software service. In one embodiment, only the exposed parameters and values 508 are injected from the software service instance deployment 502 to the customized cloud device application 504.

Figure 6:
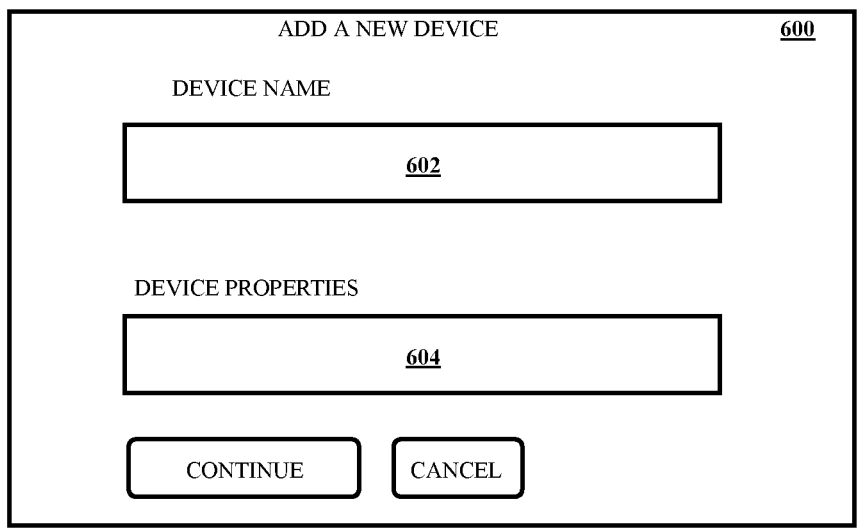
FIG. 6 is an illustration of a user interface (UI) provided at the cloud device platform to register a device, according to an embodiment.

FIG. 6 is an illustration of a user interface (UI) 600 provided at the cloud device platform to register a device, according to an embodiment. The cloud device platform has an "add new device" option (not shown) that allows a user, for example, a device manufacturer or a hardware developer, to register a new device. After a user selects the "add new device" option, the "add new device" page is displayed at the UI 600 of the cloud device platform. The "add new device" page has fields to provide device details related to the device that is to be registered at the cloud device platform. As shown, the UI 600 has fields 602 and 604 to provide "device name" and "device properties", respectively, of a device that is to be registered at the cloud device platform. The cloud device platform then generates a unique token based on the received device details. The token is a web link that is to be executed at the device. A SSH or TTY method may be used to execute the token at the device. After the token is executed at the device, the device is registered at the cloud device platform. In one embodiment, executing the token at the device installs software components on the device that allows establishing a communication between the device and the cloud device platform. Post registration, the "device name" and/or one or more "device properties" provided as device details is added as a device identifier in a device service store of the cloud device platform. The device identifier identifies the device registered at the cloud device platform.

The cloud device platform then determines the device metadata of the device. The device metadata is a collection of several device features and corresponding device feature values. In one embodiment, the cloud device platform maintains a list of device features to determine device metadata of any device. For example, the device features maintained by the cloud device platform may be "battery remaining", "OS version" and "flight velocity". In case a robot and a UAV are registered at the device then the cloud device platform communicates with the robot and the UAV to determine device feature values corresponding to these device features. Based on the determined device feature values, the device metadata for the robot and the UAV may be, for example, "battery remaining: 60%, OS version: Ubuntu 16.04, flight velocity: maximum" and "battery remaining: 40%, OS version: Ubuntu 16.04, flight velocity: 10 m/sec", respectively.

The device feature values may be either be manually provided by a user at the cloud device platform or may be automatically determined based on the detected feature values. The cloud device platform determines the device metadata of the device based on communication with the different software and hardware components of the device. The feature values may also include, for example, the sensor capability/capabilities related to the sensors detected at the device. A sensor is a device used to measure a property, such as pressure, position, temperature, or acceleration, etc. The software installed at the device during the execution of the token may include a sensor detection software component that may detect the sensors included in the device. The device may provide the sensor information as a device feature of the device. For example, when the device includes a "temperature measuring" sensor then "temperature measuring" capability is added as a device feature value for the device feature "device sensor".

In one embodiment, device metadata for a particular device may be used to populate device metadata of any later registered device. In one embodiment, the device metadata may either be provided by a user or may be determined by the cloud device platform from available online information related to the product. For example, when a UAV of a manufacturer "ABC" with model number "123" is registered at the cloud device platform then the user provided or dynamically determined metadata of this UAV may include "maximum speed=10 m/s" and "maximum ascent/descent speed=6 m/sec". When a request for registering another device with same manufacturer "ABC" and model number "123" is received at the cloud device platform then the cloud device platform automatically updates the device metadata with the previously received device metadata ("maximum speed=10 m/s" and "maximum ascent/descent speed=6 m/sec") of another device.

The cloud device platform also allows a user to execute a search query to select one or more devices for deploying and provisioning a customized cloud device application. The user may generate a search query including one or more device features and a search condition. For example, the search query may include a device feature "remaining battery" and a search condition "above 60%". The cloud device platform then displays the device identifiers of devices that have device metadata matching the search query. A user can then select the device identifier of one or more devices on which a software service and/or the customized cloud device application is to be provisioned and deployed.

Figure 7:
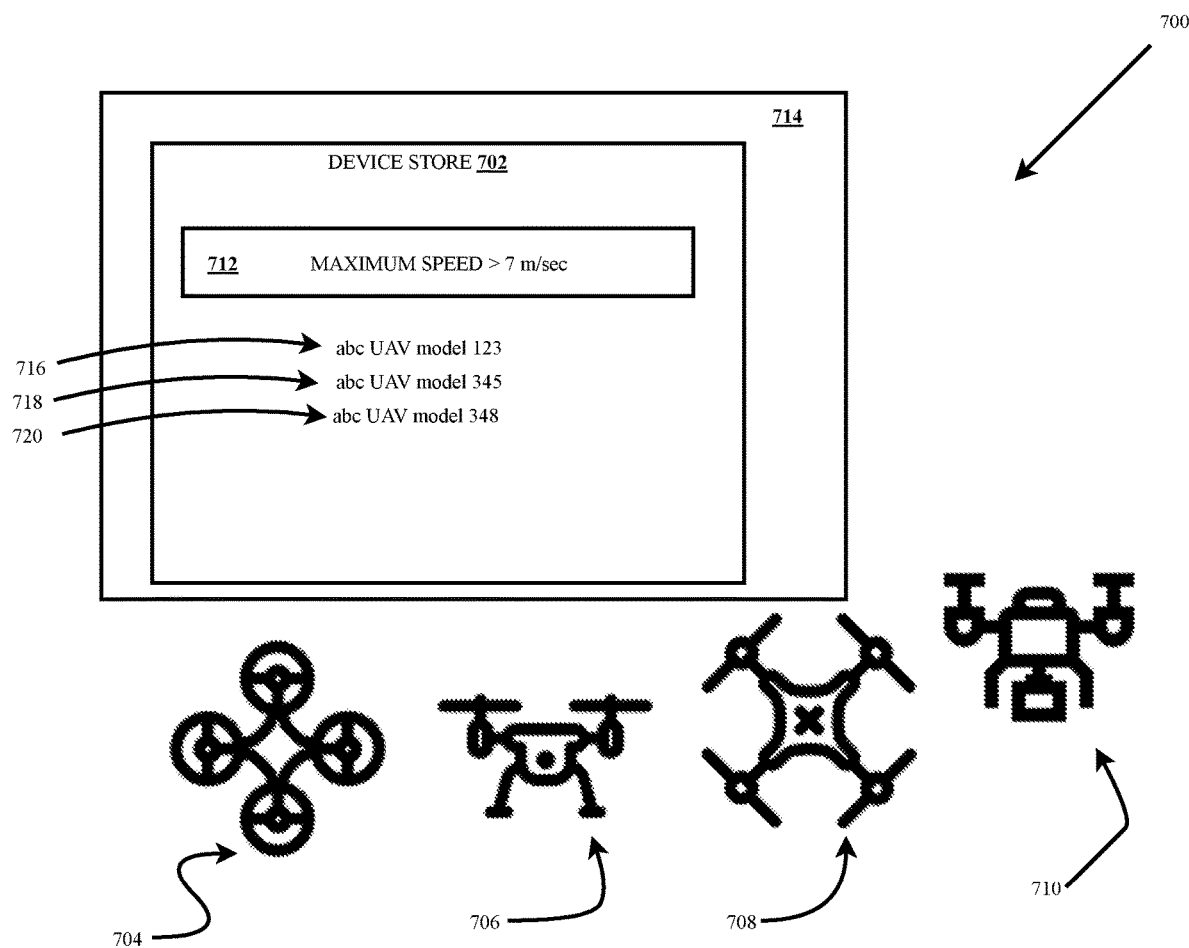
FIG. 7 is an exemplary block diagram illustrating a process to select one or more devices for deploying a customized cloud device application using the device service store, according to an embodiment.

FIG. 7 is an exemplary block diagram illustrating a process 700 to select one or more devices for deploying a customized cloud device application using the device service store 702, according to an embodiment. As shown, there are four UAVs (devices) 704, 706, 708, and 710. The UAVs 704, 706, 708, and 710 have device metadata "maximum speed=6 m/s", "maximum speed=8 m/s", "maximum speed=9 m/s" and "maximum speed=10 m/s", respectively. A user may execute a search query "maximum speed>7 m/s" 712 at a UI 714 of the cloud device platform to search for UAVs that have a maximum flying speed greater than 7 m/s. Based on matching the search criteria with the device metadata, the UAVs 704, 706, and 708 that meet the search criteria are identified. Device identifiers 716, 718, and 720 corresponding to the identified UAVs 704, 706, and 708, respectively, are displayed at the UI 714 of the cloud device platform. A user can select one or more device identifiers from the displayed device identifiers 716, 718, and 720 to select one or more of the identified UAVs 704, 706, and 708, respectively, for provisioning and deploying a customized cloud device application.

Figure 8:
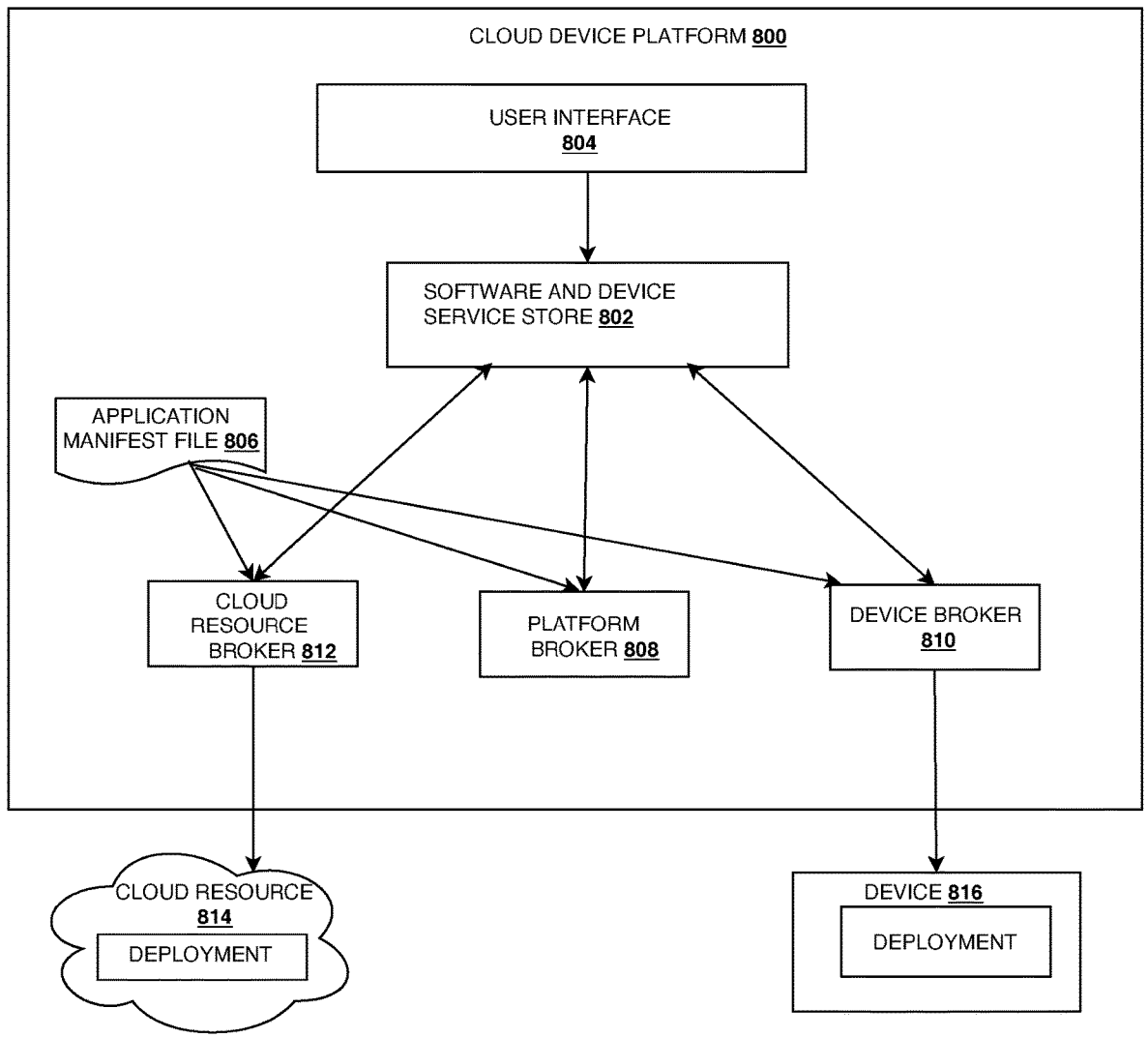
FIG. 8 is a block diagram illustrating a process to generate, deploy, and execute an application, according to an embodiment.

FIG. 8 is a block diagram illustrating a cloud device platform 800 to generate and deploy a customized cloud device application, according to an embodiment. The cloud device platform 800 includes a software and device service store 802. The software and device service store 802 includes a software service store and a device service store. As discussed, the software service store includes a collection of software services and device service store includes a collection of devices and/or cloud resources.

The cloud device platform 800 includes a user interface 804 that allows selection of the different services from the software and device service store 802 and one or more devices and/or cloud resources at which the application and/or selected software services is to be deployed. In one embodiment, the application or service definition received at the user interface 804, when defining the application or software service, is stored in an application manifest file 806. The application manifest file 806 includes information required for instantiating, provisioning, and deploying a software service and/or customized cloud device application at the cloud resource and/or devices. The application manifest file 806 also includes the selected composition pattern for binding the application or software service.

The application manifest file 806 sends the received definition of application and software services to different brokers, i.e., a platform broker 808, a device broker 810, and a cloud resource broker 812. Based on the received definition, the platform broker 808, the device broker 810, and the cloud broker 812 generate a broker API compatible software service. The broker API compatible software service is stored at the platform broker, the device broker, and cloud resource broker 808, 810, and 812, respectively. A broker is a software component that manages a lifecycle of the software service. In one embodiment, the cloud device platform broker instantiates, provisions, and deploys a software service or application to cloud resources or devices. In one embodiment, the platform broker 808, the device broker 810, and the cloud resource broker 812 conforms to a broker API that defines interaction between the cloud device platform components and the brokers 808-812, between the brokers 808-812, and between the brokers 808-812 and devices or cloud resources on which a service and/or application is to be deployed.

The platform broker 808 also manages binding of deployed instance of a software service with an instance of a customized cloud device application. In one embodiment, the platform broker 808 also receives and stores service or application identities (IDs) related to the different services and applications, respectively, received at the user interface 806 when defining the service. When a deployment request to deploy a customized cloud device application is received at user interface 804 then the deployment request is forwarded to a software and device service store 802. The software and device service store 802 then transmits the request to all the brokers, i.e., the cloud resource broker 812, the platform broker 808, and the device broker 810. The deployment request includes an application or service IDs of the customized cloud device application and services that are to be deployed. As the device broker 810 and cloud resource broker 812 do not store the service ID these brokers 810 and 812 send a response to the software and device service store 802 indicating that the request cannot be processed by these brokers. The platform broker 808 that stores the application and service ID process the received deployment request to identify whether the application or software service is to be deployed at the cloud resource or devices depending on the selected cloud and/or device resources selected at the software and device service store 802.

The platform broker 808 then sends a device or cloud deployment request to either the device broker 810 or the cloud resource broker 812, respectively, via the software and device service store 802 depending on whether one or more devices or one or more cloud resources are selected at the device store for deploying the application or the software service. The cloud or device deployment request from the platform broker 808 also includes deployment information including the identity of devices or cloud resources at which the application or software service is to be deployed. Based on the received cloud or device deployment request, the device broker 810 and the cloud resource broker 812 generates an instance of the software service. The cloud resource broker 812 or the device broker 810 then deploys the generated instance of the software service to the cloud resource 814 and device 816.

Next, the platform broker 808 receives a deployment confirmation from the cloud resource broker 812 or the device broker 810. After receiving the deployment confirmation, the platform broker 808 binds an application instance and software service instance deployment that is deployed on device 816, cloud resource 814 or a combination of cloud resource 814 and device 816. Finally the application instance bound to the deployed instance of software service is deployed at the cloud resource 814 or the device 816 by the cloud resource broker 812 or device broker 810, respectively.

FIGS. 9A-9E is a block diagram illustrating a process 900 to generate and deploy a customized cloud device application, according to an embodiment. Initially, a plurality of devices and cloud resources are registered at a cloud device platform (902). A request may be received to register the plurality of devices and the cloud resources at the cloud device platform. In one embodiment, device name and device properties may be provided at the cloud device platform for registering the device at the cloud device platform. Based on the provided device name and properties, a unique token is generated and executed for registering the device at the cloud device platform. A plurality of device identifiers corresponding to the registered plurality of devices and cloud resources is then added in a device service store at the cloud device platform (904). The device identifier may be the device name provided by a user when registering the device at the cloud device platform.

Next a device metadata is determined corresponding to the plurality of devices or cloud resources are registered at the cloud device platform, the device metadata including one or more device features (906). Next a search query including a device feature is executed to identify one or more devices or a cloud resource, from the plurality of devices or cloud resources, matching the search query (908). The one or more device identifiers corresponding to the identified one or more devices is then displayed at a user interface of the cloud device platform (910). Next a selection of device identifier corresponding to the identified one or more devices or cloud resource from the displayed one or more device identifiers is received to select the devices and/or cloud resource on which at least one of software service and customized cloud device application is to be provisioned and deployed (912).

Next a deployment request is received at the platform broker to deploy the customized cloud device application including one or more selected services (914). In one embodiment, the one or more selected services may be selected from the software service store. In one embodiment, information related to the application including the selected one or more services is included in an application manifest file. The deployment request may be received at a user interface of the cloud device platform that is then forwarded to the platform broker from the device and software service store. In one embodiment, the deployment request is auto-triggered based on one or more external conditions. The auto-triggered request is send to the platform broker from the device and software service store via one or more APIs. For example in a warehouse, a warehouse management application may detect the need of several additional transport robots executing a "transportation" related software package. The warehouse management application communicates with the cloud device platform via an API to send a request to auto deploy the "transportation related software package at the one or more devices.

Figure 9A:
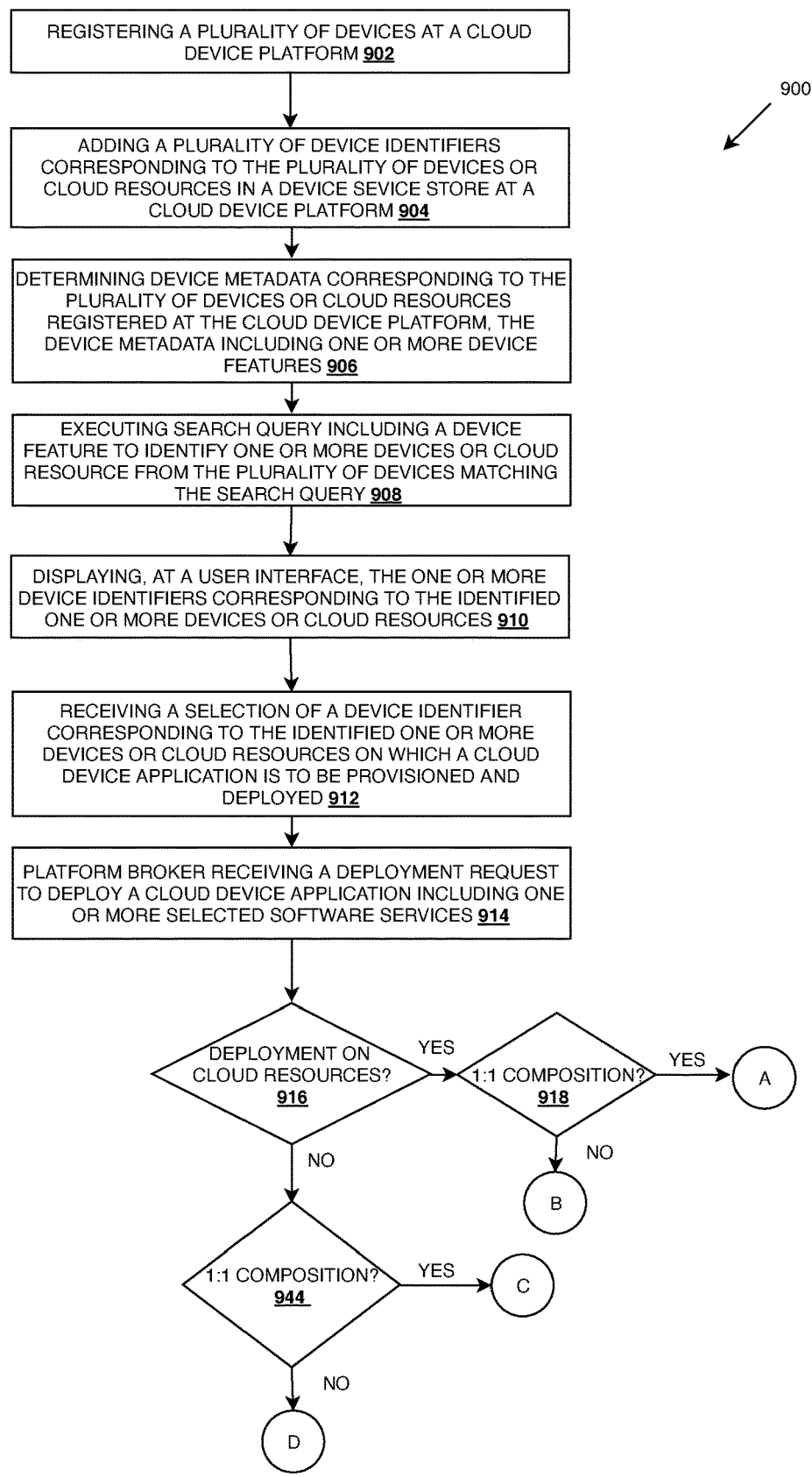
FIGS. 9A-9E is a block diagram illustrating a cloud device platform to generate, deploy, and execute customized cloud device application, according to an embodiment.
Figure 9B:
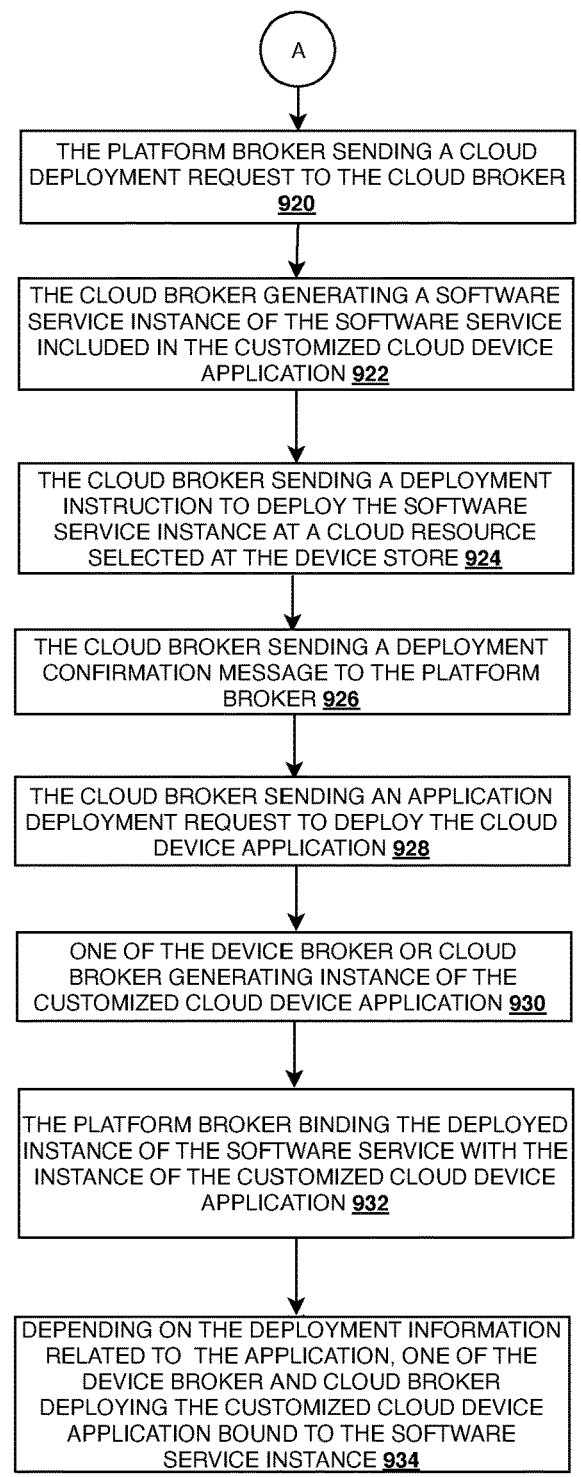

Next the platform broker analyses a deployment information related to the customized cloud device application to determine whether one or more software services in the customized cloud device application is to be deployed at a cloud resource (916). In case the one or more services are to be deployed at the cloud resource (condition in 916 is true) then the platform broker analyses the composition pattern of the customized cloud device application that is to be deployed at the cloud resource to determine whether the composition pattern is a one-to-one composition pattern (918). In case the customized cloud device application has a one-to-one composition pattern (condition in 918 is true) then the platform broker sends a cloud deployment request to a cloud broker at the cloud device platform (920), as shown in FIG. 9B. The cloud deployment request includes the deployment request received at the platform broker and a destination address of the cloud resource where the software service included in the customized cloud device application is to be deployed.

The cloud broker then generates a software service instance of the software service included in the customized cloud device application (922). The software service instance is generated based on the software service stored at the cloud broker. Next the cloud broker sends a deployment instruction to deploy the generated software service instance at the cloud resource selected at the device store (924). Based on the received instruction, the software service instance is deployed at the cloud resource. Next after the deployment, the cloud broker sends a deployment confirmation message to the platform broker (926).

The deployment confirmation message confirms that the software service has been deployed at the cloud resource.

Next the cloud platform sends an application deployment request to one of the cloud broker or device broker to a cloud device application depending on the deployment information related to the application (928). Depending on the received application deployment request, one of the cloud broker or device broker generates an instance of the customized cloud device application (930). The platform broker then binds the instance of the customized cloud device application with the deployed instance of the software service (932). In one embodiment, the platform broker receives an application instance generation confirmation from one of the device broker or the cloud broker. Finally one of the cloud broker or the device broker, depending on the deployment information at the cloud resource or the device, deploys the generated customized cloud device application instance bound to the deployed software service instance to a cloud resource or a device (934).

Figure 9C:
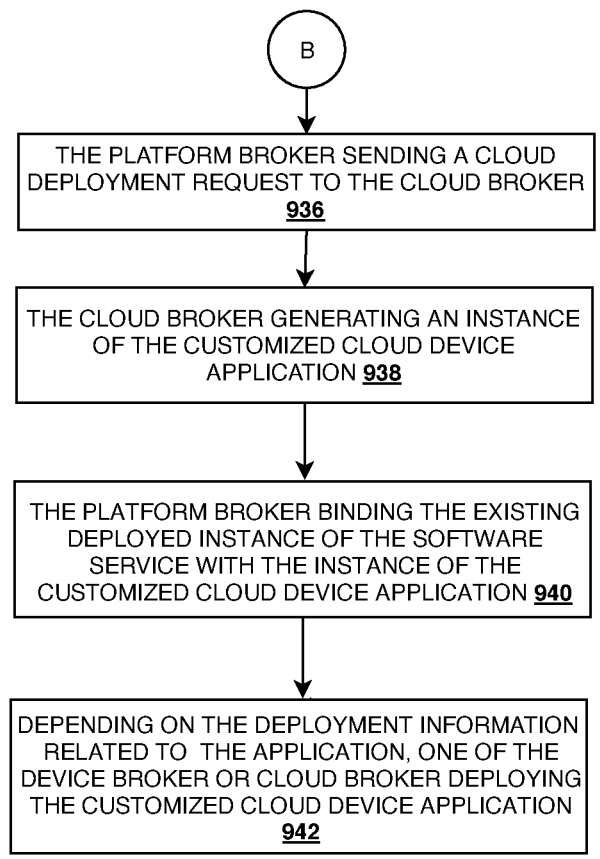

In case the composition pattern of the customized cloud device application that is to be deployed at the cloud resource is determined as one-to-many composition pattern (condition in 918 is false) then the platform broker sends a cloud deployment request to the cloud broker (936), as shown in FIG. 9C. Next the cloud broker generates an instance of the customized cloud device application (938). Next the platform broker binds the instance of the customized cloud device application with an existing deployed instance of a software service instance (940). Finally depending on the deployment information related to the customized cloud device application, one of the device broker and the cloud broker deploys the customized cloud device application instance bound to the existing deployed instance of the software service (942).

Figure 9D:
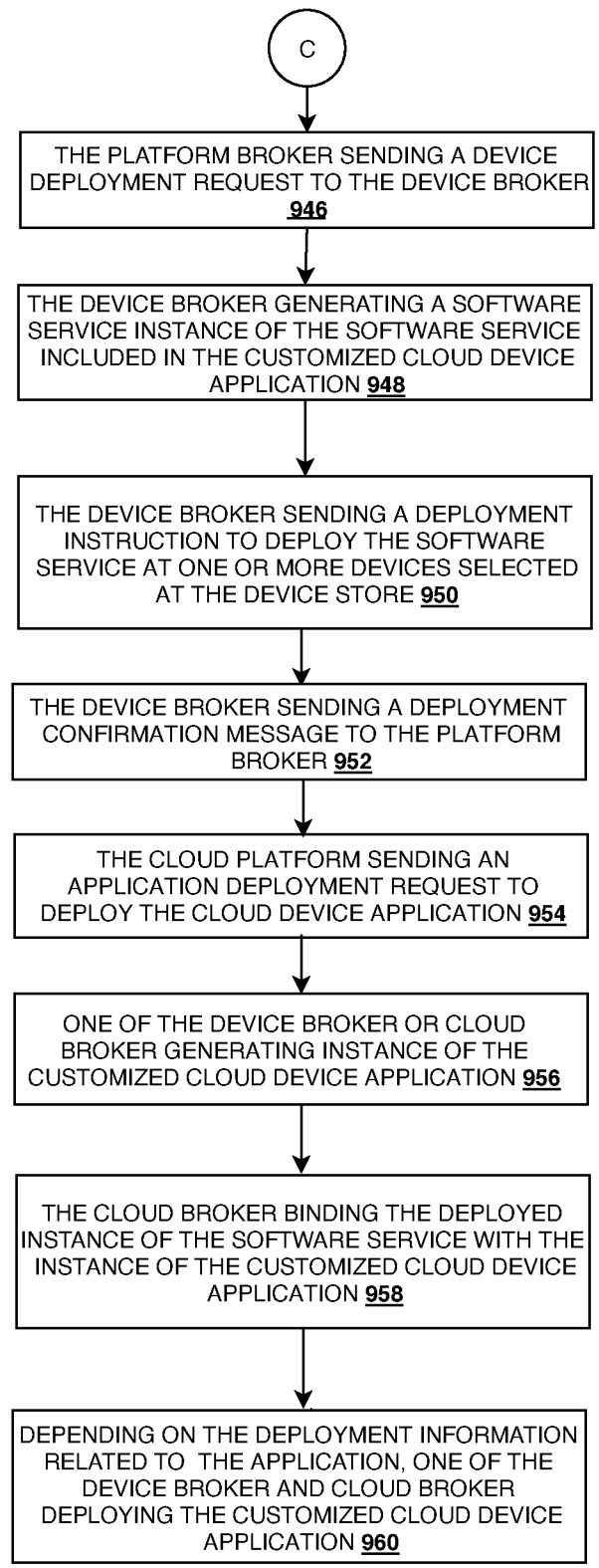
Figure 9E:
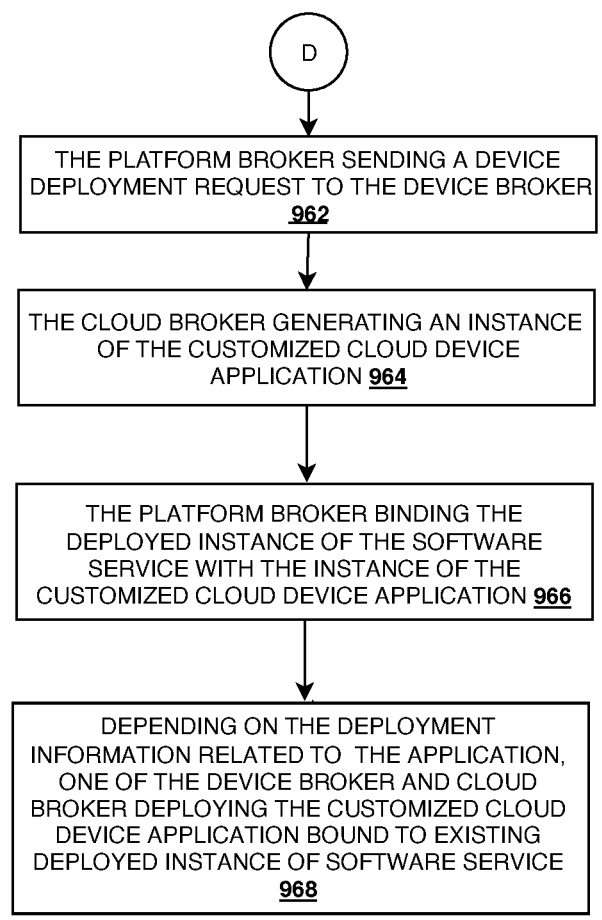

In case the platform broker determines that the deployment request is received for deployment of one or more software services included in the customized cloud device application at a device (condition in 916 is false) then the platform broker analyses the composition pattern of the customized cloud device application. The platform broker analysed the composition pattern of the application to determine whether the composition pattern of the customized cloud device application has a one-to-one composition pattern (944). In case the customized cloud device application or the software service that is to be deployed at the one or more devices has a one-to-one composition pattern (condition in 944 is true) then the platform broker sends a device deployment request to a device broker at the cloud device platform (946), as shown in FIG. 9D. The device deployment request includes the deployment request received at the platform broker and a destination address of the one or more devices where the software service included in the customized cloud device application is to be deployed.

The device broker then generates a software service instance of the software service included in the customized cloud device application (948). The software service instance is generated based on the software service stored at the device broker. Next the device broker sends a deployment instruction to deploy the generated software service instance at one or more devices selected at the device store (950). Based on the received instruction, the software service instance is deployed at the one or more devices. Next after the deployment, the cloud broker sends a deployment confirmation message to the platform broker (952).

The deployment confirmation message confirms that the software service has been deployed at the cloud resource. Next the cloud platform sends an application deployment request to one of the cloud broker or device broker depending on the deployment information related to the application (956). Depending on the received application deployment request, one of the cloud broker or device broker generates an instance of the customized cloud device application (956). The platform broker then binds the instance of the customized cloud device application with the deployed instance of the software service (958). In one embodiment, the platform broker receives an application instance generation confirmation from one of the device broker or the cloud broker. Finally one of the cloud broker or the device broker deploys the generated customized cloud device application instance bound to the deployed software service instance to a cloud resource or a device depending on the deployment information (960).

Next in case the composition pattern is determined to be a one-to-many composition pattern (condition in 944 is false) then the platform broker sends a device deployment request to the device broker for deploying the customized cloud device application (962). Next the device broker generates an instance of the customized cloud device application (964). Next the platform broker binds the instance of the customized cloud device application with an existing deployed instance of a software service instance (966). Finally depending on the deployment information related to the application, one of the device broker and the cloud broker deploys the customized cloud device application instance bound to the existing deployed instance of the software service (968).

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

The invention claimed is:

1. A computer implemented method to generate and deploy a customized cloud device application, the method comprising:

analyzing a deployment information of a software service included in the customized cloud device application;

based on the analysis, determining whether the software service is to be deployed at a cloud resource or one or more devices selected from a device store based on one or more device features;

based on the determination and a composition pattern of the customized cloud device application, sending a software service deployment request;

based on the software service deployment request, generating an instance of the software service;

deploying the generated instance of the software service to one of the cloud resource or the one or more devices;

based on a deployment information of the customized cloud device application, sending an application deployment request;

based on the application deployment request, generating an instance of the customized cloud device application;

binding the generated instance of the customized cloud device application and the deployed instance of the software service; and deploying the generated instance of the customized cloud device application bound to the deployed instance of the software service to the one or more cloud resources or the one or more devices, wherein the computer implemented method further comprises:

receiving a device registration information corresponding to plurality of cloud resources and plurality of devices; and based on the received device registration information, registering the plurality of cloud resources and the plurality of devices.

2. The computer implemented method according to claim 1, further comprising:

determining device metadata corresponding to the plurality of devices registered at the cloud device platform, the device metadata including the one or more device features; and executing a search query including a device feature, from the one or more device features included in the device metadata, to identify the one or more devices from the plurality of devices matching the search query.

3. The computer implemented method according to claim 2, wherein executing the search query includes:

displaying, at the user interface of the cloud device platform, one or more device identifiers stored at the device store corresponding to the identified one or more devices; and receiving, at the user interface of the cloud device platform, selection of a device identifier, corresponding to the device, from the displayed one or more device identifiers.

4. The computer implemented method according to claim 1, wherein binding the generated instance of the customized cloud device application with the deployed instance of software service comprises:

retrieving data corresponding to one or more exposed parameters of the deployed instance of the software service; and injecting the one or more exposed parameters data and exposed network endpoint of the deployed instance of the software service to the instance of the customized cloud device application.

5. The computer implemented method according to claim 1, wherein generating the instance of software service comprises:

determining whether the composition pattern of the customized cloud device application is a one-to-one composition pattern; and generating the instance of the software service when the selected composition pattern is the one-to-one composition.

6. The computer implemented method according to claim 1, wherein binding the generated instance of the customized cloud device application comprises:

determining whether the composition pattern of the customized cloud device application is a one-to-many composition pattern; and binding the instance of customized cloud device application with an existing instance of the deployed software service when the determined composition pattern is the one-to-many composition pattern.

7. The computer implemented method according to claim 1, wherein binding the instance of customized cloud device application comprises:

determining whether the composition pattern is singleton;

based on the determination, sending instruction to one of the device broker or the cloud broker to generate the instance of the software service for a first deployment request;

deploying the generated instance of the software service to one of the cloud resource or the one or more devices; and binding the generated instance of customized cloud device application with the instance of the deployed software service.

8. A computer system to generate and deploy a customized cloud device application, the system comprising:

a memory to store instructions;

a processor to execute the instructions;

a platform broker at a cloud device platform, analyzes a deployment information of a software service included in the customized cloud device application;

based on the analysis, the platform broker determines whether the software service is to be deployed at a cloud resource or one or more devices selected from a device store based on one or more device features;

based on the determination and a composition pattern of the customized cloud device application, the platform broker sends a software service deployment request to one of a cloud broker in communication with a plurality of cloud resources or a device broker in communication with a plurality of devices;

based on the software service deployment request, one of the cloud broker or the device broker generates an instance of the software service;

one of the cloud broker or the device broker deploys the generated instance of the software service to the cloud resource or the one or more devices selected from the device store based on the one or more device features;

based on a deployment information of the customized cloud device application, the platform broker sends an application deployment request to one or more cloud resources or a device;

based on an application deployment request received from the platform broker, one of the cloud broker or the device broker generates an instance of the customized cloud device application;

the platform broker binds the generated instance of the customized cloud device application and the deployed instance of the software service; and one of the cloud broker or the device broker deploys the generated instance of the customized cloud device application bound to the deployed instance of the software service to one of the one or more cloud resources or the device, wherein the computer system further comprises:
at a user interface of the cloud device platform,
receive a device registration information corresponding to the plurality of cloud resources and the plurality of devices; and
register the plurality of cloud resources and the plurality of devices, based on the received device registration information.

9. The computer system according to claim 8, further comprising:
a device broker at the cloud device platform, determines device metadata corresponding to the plurality of devices registered at the cloud device platform, the device metadata including the one or more device features; and
the device broker executes a search query including a device feature, from the one or more device features included in the device metadata, to identify the one or more devices from the plurality of devices matching the search query.

10. The computer system according to claim 9, wherein the processor further executes the instructions to:
display, at the user interface of the cloud device platform, one or more device identifiers stored in the device store corresponding to the identified one or more devices; and
receive, at the user interface of the cloud device platform, selection of a device identifier, corresponding to the device, from the displayed one or more device identifiers.

11. The computer system according to claim 8, further comprising:
the platform broker, retrieves data corresponding to one or more exposed parameters of the deployed instance of the software service; and
injects the one or more exposed parameters data and exposed network endpoint of the deployed instance of the software service to the instance of the customized cloud device application.

12. The computer system according to claim 8, further comprising:
the cloud device broker, determines whether the composition pattern of the customized cloud device application is a one-to-one composition pattern; and
one of the cloud broker or the device broker, generates the instance of the software service when the selected composition pattern is the one-to-one composition.

13. The computer system according to claim 8, further comprising:
the cloud broker determines whether the composition pattern of the customized cloud device application is a one-to-many composition pattern; and
bind the instance of customized cloud device application with an existing instance of the deployed software service when the determined composition pattern is the one-to-many composition pattern.

14. A non-transitory computer readable medium encoded with instructions that when executed by a computer causes the computer to:
analyze a deployment information of a software service included in a customized cloud device application;
based on the analysis, determines whether the software service is to be deployed at a cloud resource or one or more devices selected from a device store based on one or more device features;
based on the determination and a composition pattern of the customized cloud device application, send a software service deployment request;
based on the software service deployment request, generate an instance of the software service;
deploy the generated instance of the software service to one of the cloud resource or the one or more devices selected from the device store based on the one or more device features;
based on a deployment information of the customized cloud device application, send an application deployment request;
based on the application deployment request generate an instance of the customized cloud device application;
bind the generated instance of the customized cloud device application and the deployed instance of the software service; and
deploy the generated instance of the customized cloud device application bound to the deployed instance of the software service to the one or more cloud resources or the one or more devices, wherein the instructions that when executed by the computer causes the computer further to:
receive a device registration information corresponding to plurality of cloud resources and plurality of devices; and
based on the received device registration information, register the plurality of cloud resources and the plurality of devices.

15. The non-transitory computer readable medium according to claim 14 further including instructions which when executed by a computer causes the computer to:
determine device metadata corresponding to the plurality of devices registered at the cloud device platform, the device metadata including the one or more device features; and
execute a search query including a device feature, from the one or more device features included in the device metadata, to identify the one or more devices from the plurality of devices matching the search query.

16. The non-transitory computer readable medium according to claim 15 further including instructions which when executed by a computer causes the computer to:
display, at a user interface of the cloud device platform, one or more device identifiers, stored at the device store, corresponding to the identified one or more devices; and
receive, at the user interface of the cloud device platform, selection of a device identifier, corresponding to the device, from the displayed one or more device identifiers.

17. The non-transitory computer readable medium according to claim 14 further including instructions which when executed by a computer causes the computer to:
retrieve data corresponding to one or more exposed parameters of the deployed instance of the software service; and
inject the one or more exposed parameters data and exposed network endpoint of the deployed instance of the software service to the instance of the application.

18. The non-transitory computer readable medium according to claim 14 further including instructions which when executed by a computer causes the computer to:

determine whether the composition pattern of the customized cloud device application is a one-to-one composition pattern; and generate the instance of the software service when the selected composition pattern is the one-to-one composition.

19. The non-transitory computer readable medium according to claim 14 further including instructions which when executed by a computer causes the computer to:

determine whether the composition pattern of the customized cloud device application is a one-to-many composition pattern; and bind the instance of customized cloud device application with an existing instance of the deployed software service when the determined composition pattern is the one-to-many composition pattern.

20. The non-transitory computer readable medium according to claim 14 further including instructions which when executed by a computer causes the computer to:

determine whether the composition pattern is singleton;

based on the determination, send instruction to one of the device broker or the cloud broker to generate the instance of the software service for a first deployment request;

deploy the generated instance of the software service to one of the cloud resource or the one or more devices; and bind the generated instance of customized cloud device application with the instance of the deployed software service.

* * * * *